US012780743B1

(12) United States Patent
Kidd

(10) Patent No.: US 12,780,743 B1
(45) Date of Patent: Nov. 3, 2026

(54) COATED FIBER PREFORM RESISTANT TO MOLTEN SILICON ATTACK, AND METHOD OF MAKING A MATRIX COATING INCLUDING GRAIN-REFINED SILICON CARBIDE

(71) Applicant: Rolls-Royce High Temperature Composites Inc., Cypress, CA (US)

(72) Inventor: Richard W. Kidd, Cypress, CA (US)

(73) Assignee: Rolls-Royce High Temperature Composites, Inc., Cypress, CA (US)

( * ) Notice: Subject to any disclaimer, the term of this patent is extended or adjusted under 35 U.S.C. 154(b) by 796 days.

(21) Appl. No.: 18/105,349

(22) Filed: Feb. 3, 2023

Related U.S. Application Data

(60) Provisional application No. 63/324,262, filed on Mar. 28, 2022.

(51) Int. Cl.

| | |
|---|---|
| ***C04B 35/628*** | (2006.01) |
| ***C04B 35/622*** | (2006.01) |
| ***C04B 41/45*** | (2006.01) |
| ***C04B 41/50*** | (2006.01) |

(52) U.S. Cl.
CPC .. *C04B 35/62281* (2013.01); *C04B 35/62863* (2013.01); *C04B 35/62868* (2013.01); *C04B 35/62873* (2013.01); *C04B 35/62884* (2013.01); *C04B 35/62892* (2013.01); *C04B 35/62894* (2013.01); *C04B 41/4523* (2013.01); *C04B 41/4584* (2013.01); *C04B 41/5096* (2013.01); *C04B 2235/3826* (2013.01); *C04B 2235/386* (2013.01); *C04B 2235/422* (2013.01); *C04B 2235/5244* (2013.01); *C04B 2235/5252* (2013.01); *C04B 2235/616* (2013.01); *C04B 2235/9676* (2013.01)

(58) Field of Classification Search
None
See application file for complete search history.

(56) References Cited

U.S. PATENT DOCUMENTS

| | | | |
|---|---|---|---|
| 11,731,910 B1 | 8/2023 | Kidd | |
| 2005/0181192 A1* | 8/2005 | Steffier | B32B 18/00 428/293.4 |
| 2016/0159694 A1 | 6/2016 | Chamberlain et al. | |
| 2017/0159459 A1* | 6/2017 | Courcot | C04B 35/565 |

* cited by examiner

*Primary Examiner* — Michael P. Rodriguez
(74) *Attorney, Agent, or Firm* — Shumaker & Sieffert, P.A.

(57) ABSTRACT

A method of making a matrix coating resistant to molten silicon attack comprises: flowing a diluent gas comprising hydrogen or nitrogen into a process chamber containing a fiber preform, the fiber preform comprising silicon carbide fibers coated with an interphase coating; flowing a primary reactive gas comprising a first organosilicon precursor into the process chamber during the flow of the diluent gas; flowing a secondary reactive gas comprising at least one additional precursor into the process chamber during the flow of the primary reactive gas, the at least one additional precursor being selected from the group consisting of: a silicon precursor, a carbon precursor, and a second organosilicon precursor; and forming a matrix coating comprising grain-refined silicon carbide on the interphase coating, the grain-refined silicon carbide comprising silicon carbide grains having an average size in a range from about 1 nm to about 100 nm.

15 Claims, 2 Drawing Sheets

COATED FIBER PREFORM RESISTANT TO MOLTEN SILICON ATTACK, AND METHOD OF MAKING A MATRIX COATING INCLUDING GRAIN-REFINED SILICON CARBIDE

RELATED APPLICATION

The present patent document claims the benefit of priority under 35 U.S.C. § 119 (e) to U.S. Provisional Patent Application No. 63/324,262, filed on Mar. 28, 2022, and which is hereby incorporated by reference in its entirety.

TECHNICAL FIELD

The present disclosure relates generally to the fabrication of ceramic matrix composites (CMCs) and more particularly to making a coated or rigidized fiber preform that is resistant to silicon attack during melt infiltration.

BACKGROUND

Ceramic matrix composites, which include ceramic fibers embedded in a ceramic matrix, exhibit a combination of properties that make them promising candidates for industrial applications, such as gas turbine engines, that demand excellent thermal and mechanical properties along with low weight. A ceramic matrix composite that includes a silicon carbide matrix reinforced with silicon carbide fibers may be referred to as a silicon carbide/silicon carbide composite or SiC/SiC composite. Fabrication of a SiC/SiC composite may include slurry and melt infiltration steps to densify a silicon carbide fiber preform. When silicon melt infiltration is employed to complete the CMC densification, molten silicon may penetrate the silicon carbide matrix and ultimately the silicon carbide fibers, which can lead to degradation of mechanical properties. Prior to the infiltration steps, the fibers making up the silicon carbide preform may be coated with one or more materials to protect the fibers and/or improve the performance of the final densified composite.

BRIEF DESCRIPTION OF THE DRAWINGS

The embodiments may be better understood with reference to the following drawings and description. The components in the figures are not necessarily to scale. Moreover, in the figures, like-referenced numerals designate corresponding parts throughout the different views.

DETAILED DESCRIPTION

Described in this disclosure is a chemical vapor infiltration (CVI) method to form a coated fiber preform that is configured for protection against molten silicon attack during melt infiltration. The coated fiber preform includes an interphase coating and a matrix coating on silicon carbide fibers. Unique to the method is that the matrix coating itself is modified instead of, or possibly in addition to, depositing an additional barrier layer to provide the desired protection against silicon attack. In particular, the matrix coating is formed using CVI as described herein to include grain-refined silicon carbide.

Figure 1:
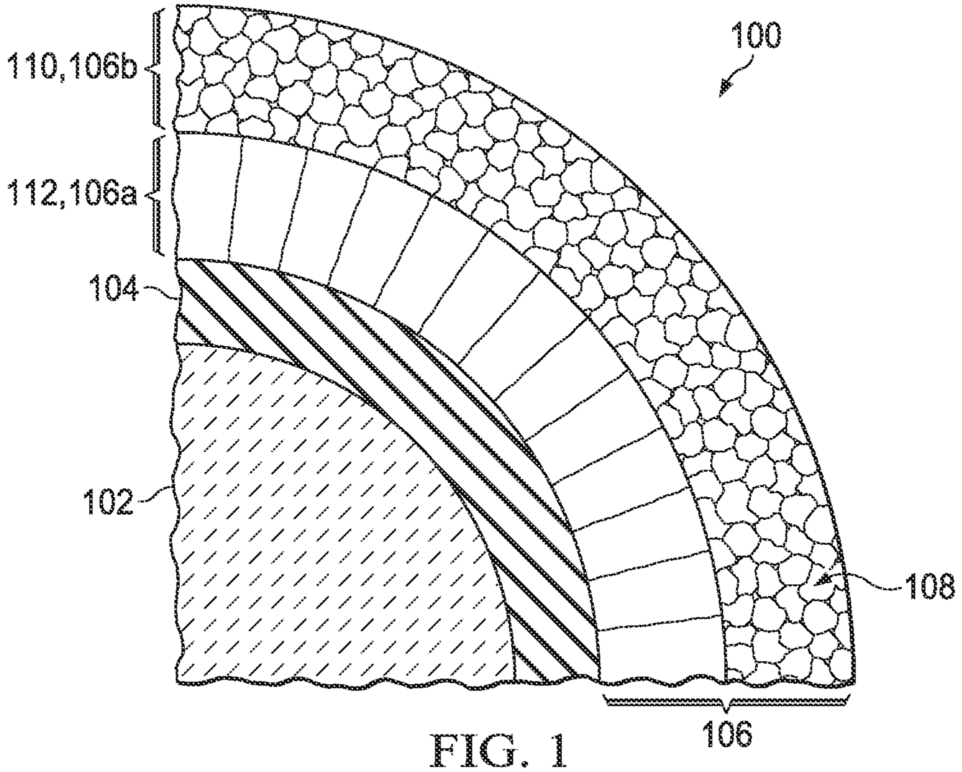
FIG. 1 is a partial cross-sectional schematic of part of a coated fiber preform showing a silicon carbide fiber or fiber tow including a matrix coating according to one embodiment.
Figure 2:
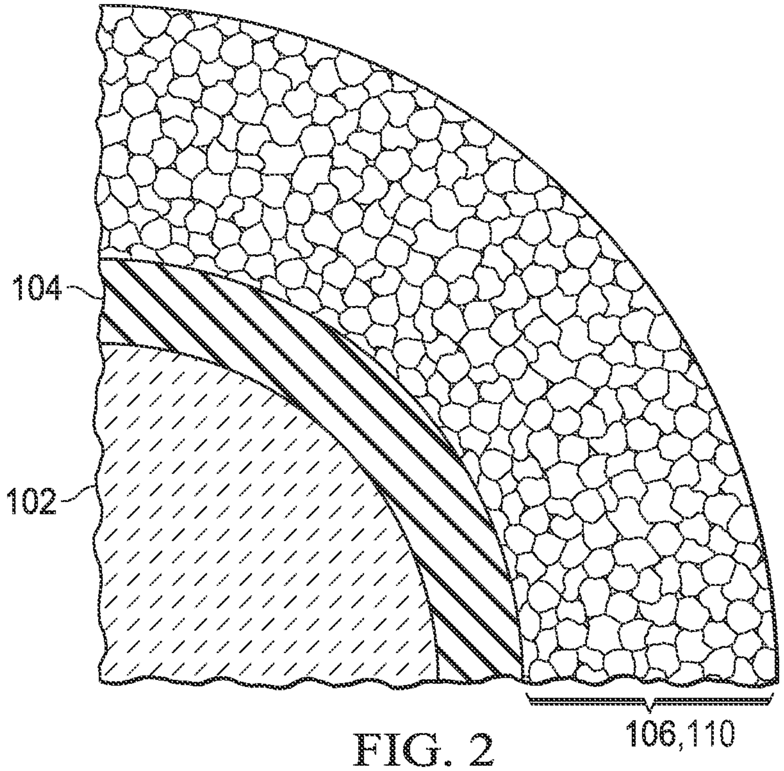
FIG. 2 is a partial cross-sectional schematic of part of a coated fiber preform showing a silicon carbide fiber or fiber tow including a matrix coating according to another embodiment.

Referring to FIG. 1, the coated fiber preform 100 includes an interphase coating 104 comprising boron nitride, silicon-doped boron nitride, and/or pyrolytic carbon on one or more silicon carbide fibers 102, and a matrix coating 106 comprising grain-refined silicon carbide 108 on the interphase coating 104. (For brevity, throughout this disclosure, the term "silicon carbide fibers" or "the silicon carbide fibers" may be used in place of "one or more silicon carbide fibers" without changing the scope of the original term.) The grain-refined silicon carbide 108 of the matrix coating 106 comprises silicon carbide grains or crystallites having an average size in a range from about 1 nm to about 100 nm. The silicon carbide grains may thus be described as nanoscale. In some examples, the average size of the silicon carbide grains may be in the range from about 1 nm to about 50 nm, or from about 1 nm to about 20 nm. Preferably, the silicon carbide grains are equiaxed. In other words, the grains may have a nominal length, width and depth that are similar or equivalent in size, and/or of the same order of magnitude. The matrix coating 106 comprising the grain-refined silicon carbide 108 may be formed using a CVI process as described below. At least one layer 110 of the matrix coating 106, or an entirety of the matrix coating 106, as shown in FIG. 2, may include the grain-refined silicon carbide 108.

In examples in which at least one layer 110 of the matrix coating 106 comprises the grain-refined silicon carbide 108, the matrix coating 106 may further comprise a conventional SiC layer 112 that does not include the grain-refined silicon carbide and which may be formed in a conventional CVI process from methyltrichlorosilane (MTS). The conventional SiC layer 112, if present, is preferably an inner layer **106*a* of the matrix coating 106, and the at least one layer 110 comprising the grain-refined silicon carbide 108 may include one or more outer layers 106*b* positioned on the inner layer 106*a* to provide the desired protection against silicon attack. The conventional SiC layer 112 may include columnar grains comprising silicon carbide that may be generally aligned with the radial direction and/or may extend through the thickness of the conventional SiC layer 112. Without the inventive outer layer(s) 106*b* which include the grain-refined silicon carbide 108, radially-aligned grain boundaries within the conventional SiC layer 112 may provide pathways for molten silicon to penetrate the matrix coating 106 during melt infiltration. The one or more outer layers 106*b* positioned over the inner (conventional) layer 106*a*, 112 may function to effectively block the molten silicon from accessing these pathways. That is, the packing of the nanoscale grains in the one or more outer layers 106*b* may hinder access to the underlying layer(s) on the silicon carbide fibers 102. The inner (conventional) layer 106*a*, 112 may be an innermost layer of the matrix coating 106 positioned on the interphase coating 104, as illustrated in FIG. 1. The one or more outer layers 106*b* may include an outermost layer of the matrix coating 106. When the at least one layer 110 including the grain-refined silicon carbide 108 constitutes an entirety of the matrix coating 106, as shown in FIG. 2, the matrix coating 106 may be devoid of any layers including the columnar grains described above. In this case, the grain-refined silicon carbide 108 may prevent or minimize access of molten silicon to the underlying interphase coating 104**.

The grain-refined silicon carbide 108 may have a chemical formula $Si_xC_{2-x}$, where $0.5 \leq x \leq 1.5$. As a consequence of the fabrication method, the matrix coating 106 may include stoichiometric (x=1) and/or non-stoichiometric silicon carbide, where in the latter case the silicon carbide includes either excess carbon (x<1) or excess silicon (x>1). Also or alternatively, the matrix coating 106 may include one or more additional phases, such as free carbon and/or free silicon, in addition to the stoichiometric and/or non-stoichiometric silicon carbide. The one or more additional phases may have nanoscale grains as described above for the grain-refined silicon carbide 108. In other words, any additional phases present in the matrix coating 106 may include grains having an average size in a range from about 1 nm to about 100 nm, from about 1 nm to about 50 nm, or from about 1 nm to about 20 nm. The nanoscale grains of the additional phase(s) may be equiaxed.

The matrix coating 106 may have a total thickness in a range from about 0.5 μm to about 10 μm. The at least one layer 110, or the one or more outer layers 106*b*, may vary in terms of thickness, composition, and/or average grain size as a consequence of the CVI deposition method. In other words, when the matrix coating 106 includes multiple layers 110,106*b*, the silicon carbide stoichiometry (e.g., value of x), phase composition (presence or absence of additional phases), average grain size, and/or thickness of the layers 110, 106*b* may be different. Each of the one or more outer layers 106*b* (or the at least one layer 110) may have a thickness in a range from about 0.01 μm (10 nm) to about 2 μm (2,000 nm). The thickness may also lie in the range from about 0.01 μm to about 0.5 μm (500 nm), or from about 0.01 μm to about 0.1 μm (100 nm). The thickness of the layer(s) 110,106*b* may be determined by the time duration of a particular CVI process before the conditions (e.g., gas precursors) are changed or CVI is halted.

A method of making a coated fiber preform 100 resistant to molten silicon attack is now described, first in general and then in more detail. The method includes depositing or forming an interphase coating 104 comprising boron nitride, silicon-doped boron nitride, and/or pyrolytic carbon on silicon carbide fibers 102, and then depositing or forming a matrix coating 106 comprising grain-refined silicon carbide 108 on the interphase coating 104. Deposition of the interphase coating 104 and the matrix coating 16 may entail CVI, which may be carried out in a controlled environment in a process chamber. CVI may take place at an elevated temperature (e.g., in a range from about 800° C. to 1100° C.). Control over the process conditions may lead to the grain-refined silicon carbide 108. As described above, the grain-refined silicon carbide 108 comprises silicon carbide grains having an average size in a range from about 1 nm to about 100 nm. In some examples, the average size of the silicon carbide grains may be in the range from about 1 nm to about 50 nm, or from about 1 nm to about 20 nm. Preferably, the silicon carbide grains are equiaxed. At least one layer 110 of the matrix coating 106, or an entirety of the matrix coating 106, may include the grain-refined silicon carbide 108.

Typically, the interphase and/or matrix coatings 104, 106 are deposited after the silicon carbide fibers 102 have been formed into fiber tows and/or a fiber preform, as described below, where interstices between adjacent silicon carbide fibers or tows 102 may be understood to constitute pores into which gases may penetrate. During CVI, gaseous reagents may infiltrate the fiber tows and/or the fiber preform and chemically react to form a deposit, coating or layer on exposed surfaces of the silicon carbide fibers 102. Deposition of the matrix coating 106 may lead to rigidization of the fiber preform 100, and thus the coated fiber preform 100 may be described as a rigidized fiber preform after CVI of the matrix coating 106. The matrix coating 106 and the grain-refined silicon carbide 108 formed by CVI may have any of the physical and chemical characteristics (e.g., thickness, stoichiometry, etc.) described above.

Figure 3:
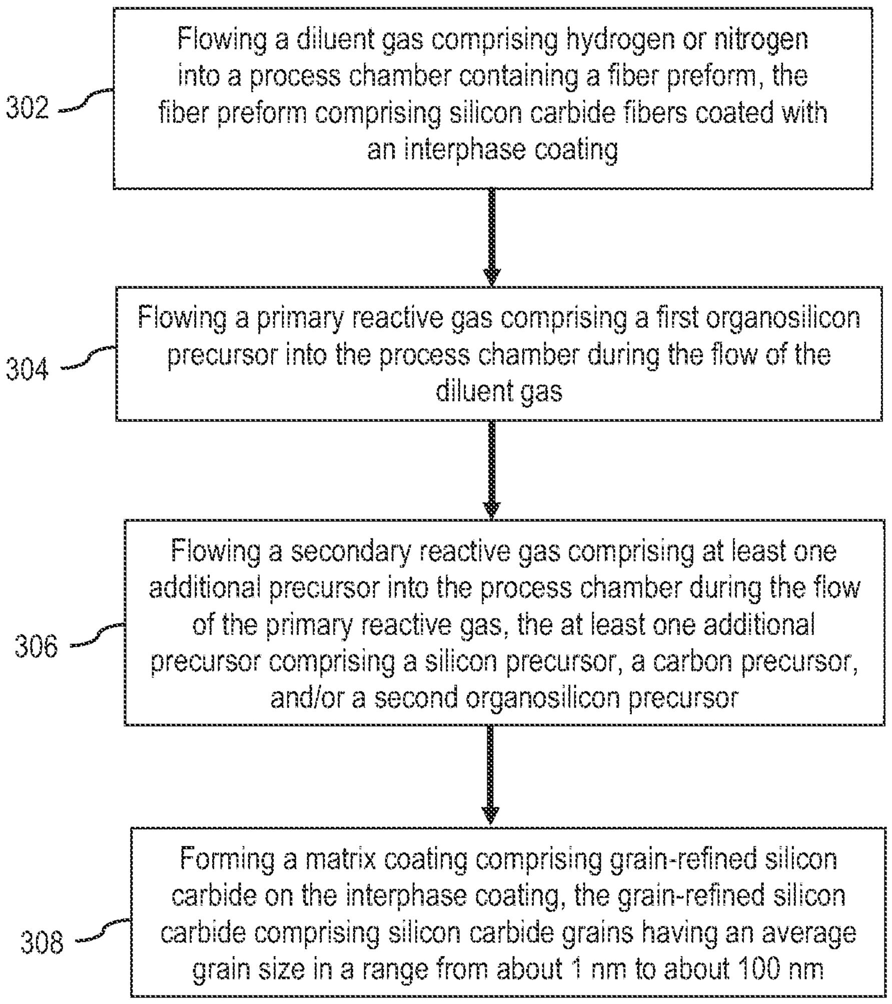
FIG. 3 is a flow chart showing steps in a method to form a matrix coating comprising grain-refined silicon carbide.

Referring to the flow chart of FIG. 3, deposition of the matrix coating 106 may comprise flowing 302 a diluent gas such as hydrogen or nitrogen into a process chamber containing a fiber preform, where the fiber preform comprises silicon carbide fibers coated with an interphase coating. A primary reactive gas comprising a first organosilicon precursor is flowed 304 into the process chamber during the flow of the diluent gas, and a secondary reactive gas comprising at least one additional precursor is flowed 306 into the process chamber during the flow of the primary gas, where the at least one additional precursor includes a silicon precursor, a carbon precursor, and/or a second organosilicon precursor. Consequently, a matrix coating 106 comprising the grain-refined silicon carbide 108 is formed or deposited 308 on the interphase layer 104. The silicon precursor may include silane ($SiH_4$), dichlorosilane ($H_2Cl_2Si$), and/or trichlorosilane ($HCl_3Si$). The carbon precursor may include methane ($CH_4$), ethane ($C_2H_6$), and/or propane ($C_3H_8$). The second organosilicon precursor may include ethyltrichlorosilane ($C_2H_5Cl_3Si$) and/or butyltrichlorosilane ($C_4H_9Cl_3Si$).

During CVI without the secondary reactive gas, the first organosilicon precursor, which may comprise methyltrichlorosilane ($CH_3SiCl_3$ or MTS) may decompose into silicon carbide and form what is described above (see also FIG. 1) as a conventional SiC layer 112 directly on the interphase coating 104; this conventional SiC layer 112 of the matrix coating 106 may not include the grain-refined silicon carbide 108. In this example, the flow of the primary reactive gas may be carried out for an initial time duration prior to introduction of the secondary reactive gas. According to one aspect of the method, the flow of the secondary reactive gas may occur intermittently during the flow of the primary reactive gas. Upon introduction of the secondary reactive gas including at least one additional precursor (selected from silicon, carbon and second organosilicon precursors), competing chemical reactions may take place that can alter the grain size, layer structure, and/or stoichiometry of the matrix coating 106. Accordingly, a matrix coating 106 having the structure shown in FIG. 1 may result. That is, the matrix coating 106 may include a conventional (inner) layer 112, 106*a* formed during the initial time duration that does not include the grain-refined silicon carbide, and at least one layer 110 comprising the grain-refined silicon carbide 108 that is formed after the secondary reactive gas is introduced.

Alternatively, the flow of the secondary reactive gas may occur continuously during the flow of the primary reactive gas. In other words, the flow of the secondary reactive gas may be simultaneous with the primary reactive gas. For example, the flow of the primary reactive gas and the flow of the secondary reactive gas may be carried out for the same time duration. Accordingly, a matrix coating 106 having the structure shown in FIG. 2 may result. That is, an entirety of the matrix coating 106 may include the grain-refined silicon carbide 108.

In some examples, the secondary reactive gas may include two or more of the additional precursors, that is, two or more of the silicon precursor, the carbon precursor, and the second organosilicon precursor. The two or more additional precursors (e.g., silane and methane, or methane and ethyltrichlorosilane, etc.) may be simultaneously incorporated into the process chamber as part of the flow of the secondary reactive gas. Alternatively, the two or more additional precursors may be sequentially incorporated (e.g., one at a time) into the process chamber as part of the flow of the secondary reactive gas. It is also contemplated that the two or more additional precursors may be incorporated into the process chamber both simultaneously and sequentially at different times during the CVI process. As a result, the matrix coating 106 may include multiple layers comprising the grain-refined silicon carbide 108 to provide the desired protection against silicon attack, where the multiple layers may be differentiated by thickness, composition (e.g., stoichiometry, phase composition), and/or average grain size. The thickness of the layer(s) may be determined by the time duration of a particular CVI process before the conditions (e.g., precursors) are changed or CVI is halted. The composition and/or average grain size may be influenced by the precursor selection and flow conditions.

A ratio of a flow rate of the secondary reactive gas to a flow rate of the primary reactive gas may be in a range from about 1:10 to about 1:2. A ratio of a flow rate of the diluent gas to the flow rate of the primary and/or secondary reactive gas may be in a range from about 4:1 to about 30:1. As indicated above, the diluent gas may comprise hydrogen ($H_2$) or nitrogen. Use of hydrogen as a diluent gas may enhance the rate of MTS decomposition and the competing chemical reactions.

The process chamber may be heated to an elevated temperature for CVI, e.g., from about 800° C. to 1100° C. To provide a controlled environment, which may be under vacuum or at atmospheric pressure, the process chamber may be a commercially available vacuum chamber or furnace including at least one inlet port in fluid communication with multiple gas sources, e.g., gas cylinders containing the diluent gas, the primary reactive gas and the secondary reactive gas, respectively. Components referred to as being "in fluid communication with" each other are understood to be directly or indirectly connected or otherwise related in such a way that fluid (e.g., a gas) can flow between the components in one or both directions. The process chamber may also include at least one exit port to expel gaseous reaction products, such as hydrogen chloride, which may be produced during MTS decomposition. The fiber preform comprising the silicon carbide fibers may be un-tooled or constrained with a tool during deposition. A suitable tool may include through-holes for passage of the gases and may be formed of a chemically inert and/or refractory material, such as graphite or silicon carbide, which is stable at the elevated temperatures at which deposition takes place. The tool may have a single-piece or multi-piece construction suitable for constraining the fiber preform in a desired configuration and for easy removal after deposition of the coatings.

During CVI, an interior of the process chamber is preferably maintained at a pressure below atmospheric pressure (760 Torr). For example, the process chamber may be maintained at a pressure in a range from about 1 Torr to about 50 Torr during delivery of the gaseous precursors and deposition of the matrix coating. Thus, prior to initiating CVI, the process chamber may be evacuated to a desired sub-atmospheric pressure level using one or more vacuum pumps. In addition, the process chamber may be heated as described above. To commence CVI, the diluent gas and reactive gas(es), e.g., the primary reactive gas and secondary reactive gas, may be delivered into the chamber at predetermined flow rates, introduction times, and time durations.

As described above, the matrix coating 106 may be deposited on an interphase coating 104 comprising boron nitride, silicon-doped boron nitride, and/or pyrolytic carbon which may enhance toughness and crack deflection in the final densified composite. The interphase coating 104 may have a single-layer or a multilayer construction and may be formed by CVI. For example, a silicon-doped boron nitride layer may be deposited on a boron nitride layer to form the interphase coating 104. Reactive gases, which may include $BX_3$ and $NH_3$, where X is selected from the group consisting of F and Cl, may be flowed into the process chamber along with a diluent gas such as hydrogen or nitrogen for a suitable time duration, yielding an interphase coating or layer 104 comprising boron nitride. In another example, reactive gases comprising boron trichloride ($BCl_3$), ammonia ($NH_3$) and a silicon-containing gas such as dichlorosilane ($H_2Cl_2Si$), trichlorosilane ($HCl_3Si$), silicon tetrachloride ($SiCl_4$), and/or silane ($SiH_4$) may be employed with a diluent gas such as hydrogen or nitrogen to produce a silicon-doped boron nitride interphase coating or layer 104. Deposition of the interphase coating 104 may take place at a temperature in a range from about 700° C. to about 925° C. Typically, the interphase coating 104 comprising boron nitride, silicon-doped boron nitride or another interphase coating material, such as pyrolytic carbon, has a thickness in a range from 0.1 μm to about 1 μm.

Due to the inclusion of grain-refined silicon carbide 108 in the matrix coating 106, the requisite protection against silicon attack of the underlying interphase coating 104 and the silicon carbide fibers 102 may be achieved. However, in some examples an additional barrier coating (e.g., comprising silicon nitrocarbide) may be applied before or after application of the matrix coating 106. Such a barrier coating may be deposited via CVI using one or more reactive gases comprising silicon, carbon and nitrogen, such as the exemplary reactive gases mentioned above, in a process chamber as described above.

The method may further comprise forming the silicon carbide fibers into a fiber preform, that is, a three-dimensional framework of the fibers, which may be arranged in tows. The CVI process described above, e.g., deposition of the matrix coating, typically takes place the silicon carbide fibers are assembled into the fiber preform. The framework may be formed by, in one example, laying up plies comprising tows of the silicon carbide fibers arranged in a two- or three-dimensional weave. After CVI, the coated or rigidized fiber preform may be infiltrated with a slurry comprising ceramic particles and optionally reactive elements/particles to form an impregnated fiber preform or "green body," i.e., a fiber preform loaded with particulate matter. Typically, the impregnated fiber preform comprises a loading level of particulate matter from about 40 vol. % to about 60 vol. %, with the remainder being porosity. The method may further comprise infiltrating the fiber preform (which may be the rigidized and/or impregnated fiber preform described above) with a melt comprising silicon followed by cooling, thereby forming a densified ceramic matrix composite. Advantageously, due to the grain-refined structure of the matrix coating described above, molten silicon attack of the silicon carbide fibers is avoided.

The molten material infiltrated into the fiber preform may consist essentially of silicon (e.g., elemental silicon and any incidental impurities) or may comprise a silicon-rich alloy. Melt infiltration may be carried out at a temperature at or above the melting temperature of silicon or the silicon alloy which is infiltrated. Thus, the temperature for melt infiltration is typically in a range from about 1350° C. to about 1500° C. A suitable time duration for melt infiltration may be from 15 minutes to four hours, depending in part on the size and complexity of the ceramic matrix composite to be formed. A ceramic matrix is formed from ceramic particles as well as ceramic reaction products created from the reaction between the molten silicon or silicon alloy and any other particles (e.g., carbon particles, refractory metal particles) in the fiber preform. Typically, the ceramic matrix comprises silicon carbide, but may also or alternatively comprise silicon oxycarbide, silicon nitride, alumina, aluminosilicate, and/or boron carbide or another refractory carbide. The fibers that serve as the framework of the fiber preform typically comprise silicon carbide, but may also or alternatively comprise another ceramic, such as silicon nitride, alumina, or aluminosilicate, or carbon. In some examples, the ceramic matrix composite may be referred to as a SiC/SiC composite. The ceramic matrix composite may form part or all of a component of a gas turbine engine, such as a blade or vane.

To clarify the use of and to hereby provide notice to the public, the phrases "at least one of <A>, <B>, . . . and <N>" or "at least one of <A>, <B>, . . . <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed. Unless otherwise indicated or the context suggests otherwise, as used herein, "a" or "an" means "at least one" or "one or more."

While various embodiments have been described, it will be apparent to those of ordinary skill in the art that many more embodiments and implementations are possible. Accordingly, the embodiments described herein are examples, not the only possible embodiments and implementations.

The subject-matter of the disclosure may also relate, among others, to the following aspects:

A first aspect relates to a coated fiber preform resistant to molten silicon attack, the coated fiber preform comprising: silicon carbide fibers; an interphase coating comprising boron nitride, silicon-doped boron nitride, and/or pyrolytic carbon on the silicon carbide fibers; and a matrix coating comprising grain-refined silicon carbide on the interphase coating, the grain-refined silicon carbide comprising silicon carbide grains having an average size in a range from about 1 nm to about 100 nm.

A second aspect relates to the coated fiber preform of the first aspect, wherein the average size is in the range from about 1 nm to about 50 nm.

A third aspect relates to the coated fiber preform of any preceding aspect, wherein the silicon carbide grains are equiaxed.

A fourth aspect relates to the coated fiber preform of any preceding aspect, wherein an entirety of the matrix coating includes the grain-refined silicon carbide.

A fifth aspect relates to the coated fiber preform of any preceding aspect, wherein at least one layer of the matrix coating includes the grain-refined silicon carbide.

A sixth aspect relates to the coated fiber preform of the fifth aspect, wherein the matrix coating further comprises a conventional SiC layer that does not include the grain-refined silicon carbide.

A seventh aspect relates to the coated fiber preform of the sixth aspect, wherein the conventional SiC layer is an inner layer, and wherein the at least one layer comprises one or more outer layers comprising the grain-refined silicon carbide, the one or more outer layers being positioned on the inner layer.

An eighth aspect relates to the coated fiber preform of the seventh aspect, wherein the inner layer is an innermost layer positioned on the interphase coating, and wherein the inner layer comprises columnar grains.

A ninth aspect relates to the coated fiber preform of the fifth aspect, wherein the matrix coating includes multiple layers comprising the grain-refined silicon carbide, the layers being differentiated by thickness, composition, and/or average grain size.

A tenth aspect relates to a method of making a matrix coating resistant to molten silicon attack, the method comprising: flowing a diluent gas comprising hydrogen or nitrogen into a process chamber containing a fiber preform, the fiber preform comprising silicon carbide fibers coated with an interphase coating; flowing a primary reactive gas comprising a first organosilicon precursor into the process chamber during the flow of the diluent gas; flowing a secondary reactive gas comprising at least one additional precursor into the process chamber during the flow of the primary reactive gas, the at least one additional precursor being selected from the group consisting of: a silicon precursor, a carbon precursor, and a second organosilicon precursor; and forming a matrix coating comprising grain-refined silicon carbide on the interphase coating, the grain-refined silicon carbide comprising silicon carbide grains having an average size in a range from about 1 nm to about 100 nm.

An eleventh aspect relates to the method of the tenth aspect, wherein the flowing of the secondary reactive gas occurs continuously during the flow of the primary reactive gas.

A twelfth aspect relates to the method of the tenth or eleventh aspect, wherein the flowing of the secondary reactive gas occurs intermittently during the flow of the first organosilicon gas.

A thirteenth aspect relates to the method of any of the tenth through the twelfth aspects, wherein the first organosilicon precursor comprises methyltrichlorosilane.

A fourteenth aspect relates to the method of any of the tenth through the thirteenth aspects, wherein the silicon precursor is selected from the group consisting of silane, dichlorosilane, and trichlorosilane, wherein the carbon precursor is selected from the group consisting of methane, ethane, and propane, and/or wherein the second organosilicon precursor is selected from the group consisting of ethyltrichlorosilane and butyltrichlorosilane.

A fifteenth aspect relates to the method of any of the tenth through the fourteenth aspects, wherein two or more of the silicon precursor, the carbon precursor, and the second organosilicon precursor are simultaneously incorporated into the process chamber as part of the flow of the secondary reactive gas.

A sixteenth aspect relates to the method of any of the tenth through the fifteenth aspects, wherein two or more of the silicon precursor, the carbon precursor, and the second organosilicon precursor are sequentially incorporated into the process chamber as part of the flow of the secondary reactive gas.

A seventeenth aspect relates to the method of any of the tenth through the sixteenth aspects, wherein the matrix coating includes multiple layers comprising the grain-refined silicon carbide, the multiple layers being differentiated by thickness, composition, and/or average grain size.

An eighteenth aspect relates to the method of any of the tenth through the seventeenth aspects, wherein a ratio of a flow rate of the secondary gas to a flow rate of the primary gas is in a range from about 1:10 to about 1:2.

A nineteenth aspect relates to the method of any of the tenth through the eighteenth aspects, wherein the process chamber is maintained at a temperature in a range from about 800° C. to 1100° C.

An twentieth aspect relates to a method of making a ceramic matrix composite, the method comprising: depositing an interphase coating comprising boron nitride, silicon-doped boron nitride, and/or pyrolytic carbon on silicon carbide fibers; depositing a matrix coating comprising grain-refined silicon carbide on the interphase coating, the grain-refined silicon carbide comprising silicon carbide grains having an average size in a range from about 1 nm to about 100 nm; after depositing the matrix coating, infiltrating a fiber preform comprising the silicon carbide fibers with a slurry; and after infiltration with the slurry, infiltrating the fiber preform with a melt comprising silicon and then cooling the melt, thereby forming a ceramic matrix composite.

In addition to the features mentioned in each of the independent aspects enumerated above, some examples may show, alone or in combination, the optional features mentioned in the dependent aspects and/or as disclosed in the description above and shown in the figures.

What is claimed is:

1. A method of making a matrix coating resistant to molten silicon attack, the method comprising:

flowing a diluent gas comprising hydrogen or nitrogen into a process chamber containing a fiber preform, the fiber preform comprising silicon carbide fibers coated with an interphase coating;

flowing a primary reactive gas comprising a first organosilicon precursor into the process chamber during the flow of the diluent gas;

flowing a secondary reactive gas comprising at least one additional precursor into the process chamber simultaneously with the primary reactive gas, the at least one additional precursor being selected from the group consisting of: a silicon precursor, a carbon precursor, and a second organosilicon precursor; and forming a matrix coating comprising grain refined silicon carbide on the interphase coating, the grain-refined silicon carbide comprising silicon carbide grains having an average size in a range from about 1 nm to about 100 nm.

2. The method of claim 1, wherein the flowing of the secondary reactive gas occurs simultaneously with the flowing of the primary reactive gas during the entire flowing of the primary reactive gas.

3. The method of claim 1, wherein the flowing of the secondary reactive gas occurs simultaneously with the flowing of the primary reactive gas during a portion of the flowing of the primary reactive gas.

4. The method of claim 1, wherein the first organosilicon precursor comprises methyltrichlorosilane.

5. The method of claim 1, wherein the silicon precursor is selected from the group consisting of silane, dichlorosilane, and trichlorosilane, wherein the carbon precursor is selected from the group consisting of methane, ethane, and propane, and/or wherein the second organosilicon precursor is selected from the group consisting of ethyltrichlorosilane and butyltrichlorosilane.

6. The method of claim 1, wherein two or more of the silicon precursor, the carbon precursor, and the second organosilicon precursor are simultaneously incorporated into the process chamber as part of the flow of the secondary reactive gas.

7. The method of claim 1, wherein two or more of the silicon precursor, the carbon precursor, and the second organosilicon precursor are sequentially incorporated into the process chamber as part of the flow of the secondary reactive gas.

8. The method of claim 1, wherein the matrix coating includes multiple layers comprising the grain-refined silicon carbide, the multiple layers being differentiated by thickness, composition, and/or average grain size.

9. The method of claim 1, wherein a ratio of a flow rate of the diluent gas to a flow rate of the primary gas and/or secondary gas is in a range from about 4:1 to about 30:1.

10. The method of claim 1, wherein the process chamber is maintained at a temperature in a range from about 800° C. to 1100° C.

11. The method of claim 1, wherein the forming the matrix coating further comprises forming the matrix coating as a partially non-stoichiometric matrix coating.

12. The method of claim 11, wherein the forming the matrix coating further comprises forming the matrix coating to include non-stoichiometric silicon carbide comprising excess carbon.

13. The method of claim 11, wherein the forming the matrix coating further comprises forming the matrix coating to include non-stoichiometric silicon carbide comprising excess silicon.

14. The method of claim 11, wherein the forming the matrix coating further comprises forming the matrix coating to include additional phases of free carbon and free-silicon.

15. The method of claim 1, further comprising forming the matrix coating such that an entirety of the matrix coating comprises grain-refined silicon-carbide.

* * * * *